United States Patent
Kojima

(10) Patent No.: US 6,826,767 B1
(45) Date of Patent: Nov. 30, 2004

(54) CARTRIDGE CONTAINING DISK AND DEVICE FOR RECORDING OR REPRODUCING SIGNAL ON OR FROM THE DISK

(75) Inventor: Yasushi Kojima, Nishinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 340 days.

(21) Appl. No.: 10/019,300

(22) PCT Filed: Jun. 30, 2000

(86) PCT No.: PCT/JP00/04386

§ 371 (c)(1),
(2), (4) Date: Jan. 7, 2002

(87) PCT Pub. No.: WO01/04899

PCT Pub. Date: Jan. 18, 2001

(30) Foreign Application Priority Data

Jul. 8, 1999 (JP) ............................................ 11/194128

(51) Int. Cl.[7] .......................... G11B 17/03; G11B 33/02
(52) U.S. Cl. .................................... 720/630; 369/77.21
(58) Field of Search ............................... 369/75.1–75.2, 369/77.1–77.2, 291, 77.21, 77.11, 75.11; 360/99.08, 99.12, 133; 720/630, 738

(56) References Cited

FOREIGN PATENT DOCUMENTS

| JP | 63-229659 | 9/1988 |
|----|-----------|--------|
| JP | 7-226000 | 8/1995 |
| JP | 9-282766 | 10/1997 |
| JP | 10-228705 | 8/1998 |
| JP | 02001176163 A | * 6/2001 |
| JP | 02001351355 A | * 12/2001 |
| JP | 02002157802 A | * 5/2002 |

* cited by examiner

*Primary Examiner*—Allen Cao
(74) *Attorney, Agent, or Firm*—Westerman, Hattori, Daniels & Adrian, LLP

(57) ABSTRACT

A cartridge has a shutter movable forward and rearward for exposing or alternatively enclosing a disk contained in a shell. The shell is inserted into a device provided with a tooth for opening the shutter and a spring piece fittable to the shutter and positioned at a level different from that of the tooth. The shell has a slit formed in a side face thereof in the vicinity of the shutter for permitting the tooth to advance thereinto. The shell has a corner in the vicinity of the slit and providing a contact face. The slit is provided at a front end portion thereof with a guide groove positioned in the contact face and enlarging toward the front. The contact face is in the form of a circular arc or slope and so shaped that the path of movement thereof intersects the inner end of the tooth at a location B which is positioned forwardly of a position A where the path of movement intersects the spring piece.

2 Claims, 8 Drawing Sheets

CARTRIDGE CONTAINING DISK AND DEVICE FOR RECORDING OR REPRODUCING SIGNAL ON OR FROM THE DISK

TECHNICAL FIELD

The present invention relates to cartridges containing disks and signal recording or reproduction devices for the disk.

BACKGROUND ART

FIG. 10 is a perspective view of a conventional cartridge 6 [see JP-B No. 7-36261(1995)]. The cartridge 6 comprises a flat shell 9 containing a disk 60. The shell 6 has a side face provided with a slit 5. In the vicinity of the slit 5, the shell 9 has an aperture 63 formed in the upper wall thereof for exposing the disk 60. A shutter 61 is provided over the aperture 63 and the slit 5. A fitting hole 62 is formed in a side wall of the shutter 61. The shutter 61 is held closed by a lock claw (not shown) within the shell 9.

The cartridge 6 is inserted into a holder 2 pivoted to a chassis 1. Provided inside the holder 2 is a tooth 31 movable into the slit 5 and a spring piece 37 fittable into the fitting hole 62 in the shutter 61. The tooth 31 has an inner end positioned inwardly of the spring piece 37. When the cartridge 6 is inserted into the holder 2, the shutter 61 moves past the spring piece 37 and comes into contact with one end of the tooth 31. The tooth 31 releases the lock claw from the shutter and pushes the shutter 61 open. When the holder 2 is lowered toward the chassis 1 in this state, signals can be recorded or reproduced. In the following description, the direction in which the cartridge 6 is inserted into the holder 2 will be referred to as the "front," and the opposite direction as the "rear."

FIG. 11 is a view in section of the holder 2 with the cartridge 6 inserted therein as the holder is seen from the direction of arrow A in FIG. 10. When the cartridge 6 is to be unloaded from the state shown in FIG. 11, the cartridge 6 is manually pulled out of the holder 2 in a raised state. Since the spring piece 37 is fitting to the shutter 61, the shutter 61 is closed when the cartridge 6 is pulled out. When the cartridge 6 is further pulled out with the shutter 61 closed, the shutter 61 is released from the spring piece 37 fitting thereto, and the cartridge 6 is unloaded from the holder.

FIG. 12 is a side elevation showing the levels of the slit 5 of the cartridge 6, the spring piece 37 and the tooth 31. For convenience of description, the tooth 31 is shown as brought closer to the spring piece 37. The fitting hole 62 of the shutter 61 is positioned at the approximate midportion of thickness of the cartridge 6, and the spring piece 37 is positioned at a level corresponding to the hole 62. The slit 5 is positioned slightly upwardly of the approximate midportion of thickness of the cartridge 6, while the tooth 31 is positioned at a level corresponding to the slit 5. The slit 5 is positioned as shifted from the approximate midportion of thickness of the cartridge 6, so that when the cartridge 6 is inserted as turned upside down in error, the tooth 31 fails to fit into the slit 5. This obviates the likelihood that the cartridge 6 will be erroneously inserted as turned upside down.

The slit 5 comprises a horizontal groove 51 extending forward, and a guide groove 50 continuously extending from the front end of the horizontal groove 51 and enlarging toward the front. The provision of the guide groove 50 renders the tooth 31 fittable into the slit 5 easily. The lower end of the spring piece 37 is positioned downwardly of the lower edge of the horizontal grooved portion 51, such that when the cartridge 6 is inserted toward the spring piece 37, the spring piece 37 moves as opposed to the lower side edge of the horizontal grooved portion 51.

However, the construction described above has the following problem to be solved.

It is likely that the cartridge 6 will be inserted into the holder 2 while backlashing upward and downward. The spring piece 37 is then likely to move into the slit 5 through the guide groove 50 as if wedging into the guide groove 50 of the slit 5, possibly making the cartridge 6 unable to further move into the holder.

This problem may be solved by decreasing the size of the front opening of the guide groove 50, whereas this conversely makes it difficult for the tooth 31 to enter the slit 5.

While conducting studies on countermeasures against this problem, the present applicant directed attention to the fact that when the cartridge 6 is inserted into the holder 2 while allowing the cartridge to backlash up and down, both the spring piece 37 and the tooth 31 enter the slit 5 through the front opening of the guide groove 50. In other words, the applicant noticed that if the spring piece 37 comes into contact with the upper or lower end of the horizontal grooved portion 51 at the side portion of the cartridge 6 without fitting into the guide groove 50 even if the cartridge 6 backlashes up and down, the spring piece 37 encounters difficulty in entering the slit 5 since the horizontal groove 51 has a smaller width than the front opening of the guide groove 50.

An object of the present invention is to make it difficult for the spring piece to enter the slit by a simple construction.

DISCLOSURE OF THE INVENTION

A shell 9 has a corner in the vicinity of a slit 5 and providing a contact face 90. The slit 5 is provided at a front end portion thereof with a guide groove 50 positioned in the contact face 90 and enlarging toward the front.

The contact face 90 is in the form of a circular arc or slope and so shaped that the path of movement thereof intersects a spring piece 37 at a location A which is positioned rearwardly of a position B where the path of movement intersects the inner end of a tooth 31.

BEST MODE OF CARRYING OUT THE INVENTION

With reference to the drawings, an embodiment of the present invention will be described below in detail.

[General Description of Cartridge]

Figure 3:
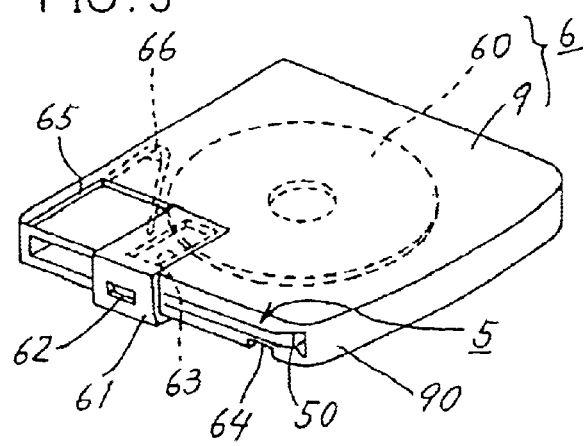
FIG. 3 is a perspective view of a cartridge proposed by the present applicant.

FIG. 3 is a perspective view of a cartridge 6 proposed by the present applicant. The cartridge 6 comprises a flat shell 9 containing a disk 60. The shell 9 has a side face having a slit 5 and an upper wall provided with a recessed portion 65. An aperture 63 is formed in the recessed portion 65 for exposing the disk 60. A shutter 61 for covering the aperture 63 is slidably disposed in the recessed portion 65 and fitted over the slit 5. A fitting hole 62 is formed in a side wall of the shutter 61. The upper surface of the shutter 61 is positioned in the same plane as the upper surface of the shell 9. The shutter 61 is biased toward a closing direction by a torsion spring 66 within the shell 9 and is automatically closed even if opened inadvertently. A caved portion 64 is formed in the bottom wall of the cartridge 6. A slide member 3 is engageable in the caved portion 64 as will be described later. With the shutter 61 opened, the disk 60 within the shell 9 is partly exposed to record signals thereon or reproduce signals therefrom.

The shell 9 has a front end corner which is chamfered and thereby provided with a circular-arc contact face 90. The slit 5 has a front end positioned in the contact face 90 to provide a guide groove 50 enlarging toward the front.

The present embodiment is characterized in that the position B where a tooth 31 for opening the shutter 61 comes into contact with the contact face 90 as will be described later is shifted forwardly of the position A where a spring piece 37 fittable to the shutter 61 comes into contact with the contact face 90 (see FIG. 9). A description will be given first of the construction of the device to be loaded with the cartridge 6 and the insertion of the cartridge into the device.

[Overall Construction of the Device]

Figure 1:
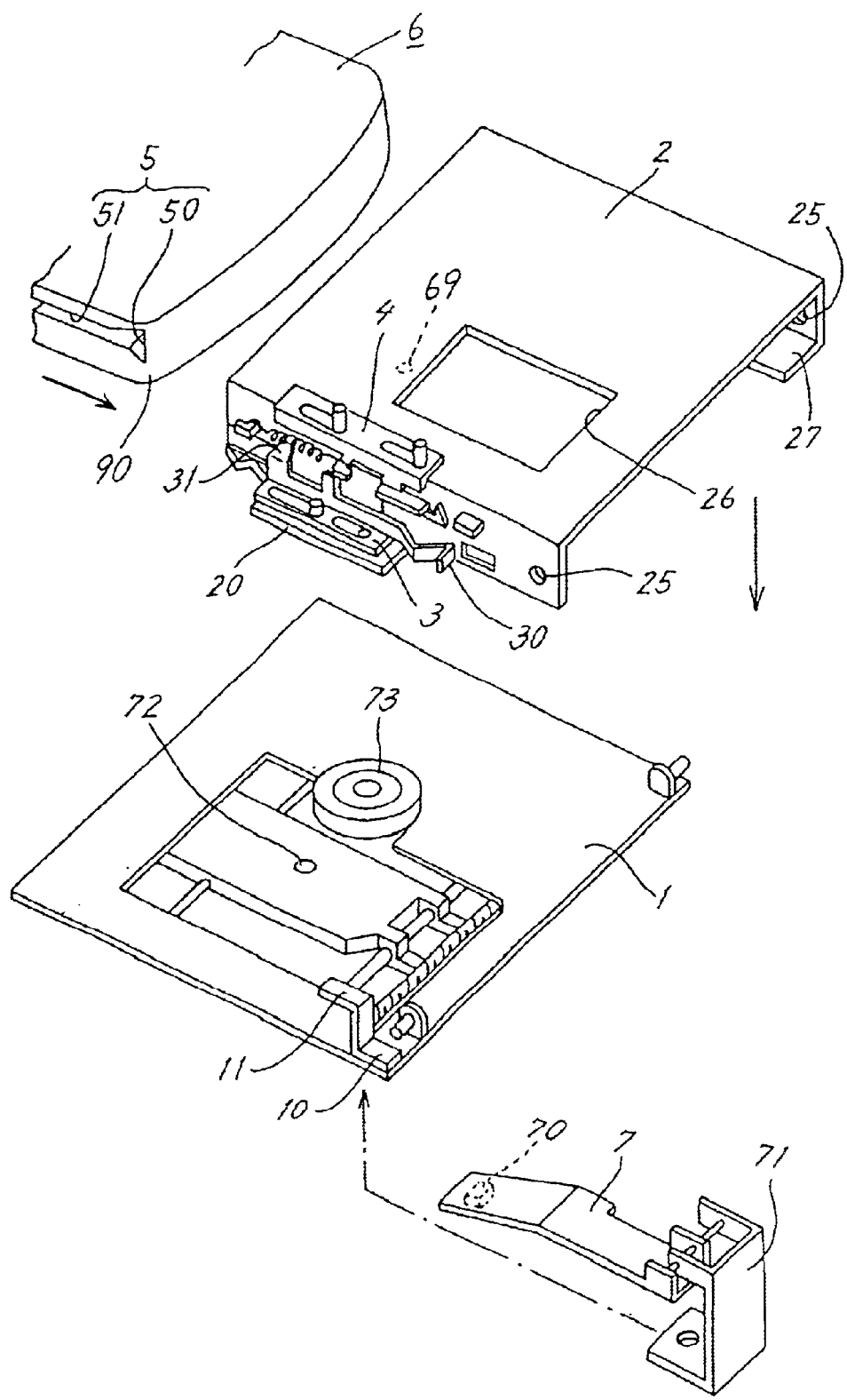
FIG. 1 is an exploded perspective view of a disk recording or reproduction device.

FIG. 1 is an exploded perspective view of the recording or reproduction device for disks. A holder 2 is pivoted as at 25 at one end thereof to a chassis 1 provided with a pickup 72, and the cartridge 6 is inserted into the holder 2. The pickup 72 is movable toward or away from a turntable 73. A bracket 71 is attached to bottom face of the pickup 72. A head lever 7 provided with a recording head 70 at an outer end thereof is pivoted at a base end thereof to the bracket 71. The head lever 7 is advanced by a lift mechanism (not shown) into the holder 2 through an opening 26 formed in an upper wall of the holder 2. Provided on the inner surface of the upper wall of the holder 2 is a projection 69 to be brought into contact with the upper surface of the cartridge 6. As will be described later, this projection 69 is one of the features of the invention. The recording head 70 is brought into contact with the disk 60 within the cartridge 6 to record signals thereon as is known well.

Release means 10 having a projecting upper plate 11 is provided at one corner of front end of the chassis 1. The release means 10 disengages the cartridge 6 from the holder 2 when the holder 2 as lowered is raised.

The holder 2 has a bearing plate 27 inwardly projecting from the lower end of a side plate thereof. The bottom wall of the cartridge 6 is placed on the support plate 27. Extending outward from the lower end of a side portion of the holder 2 is a support plate 20 for supporting thereon the slide member 3.

Figure 2:
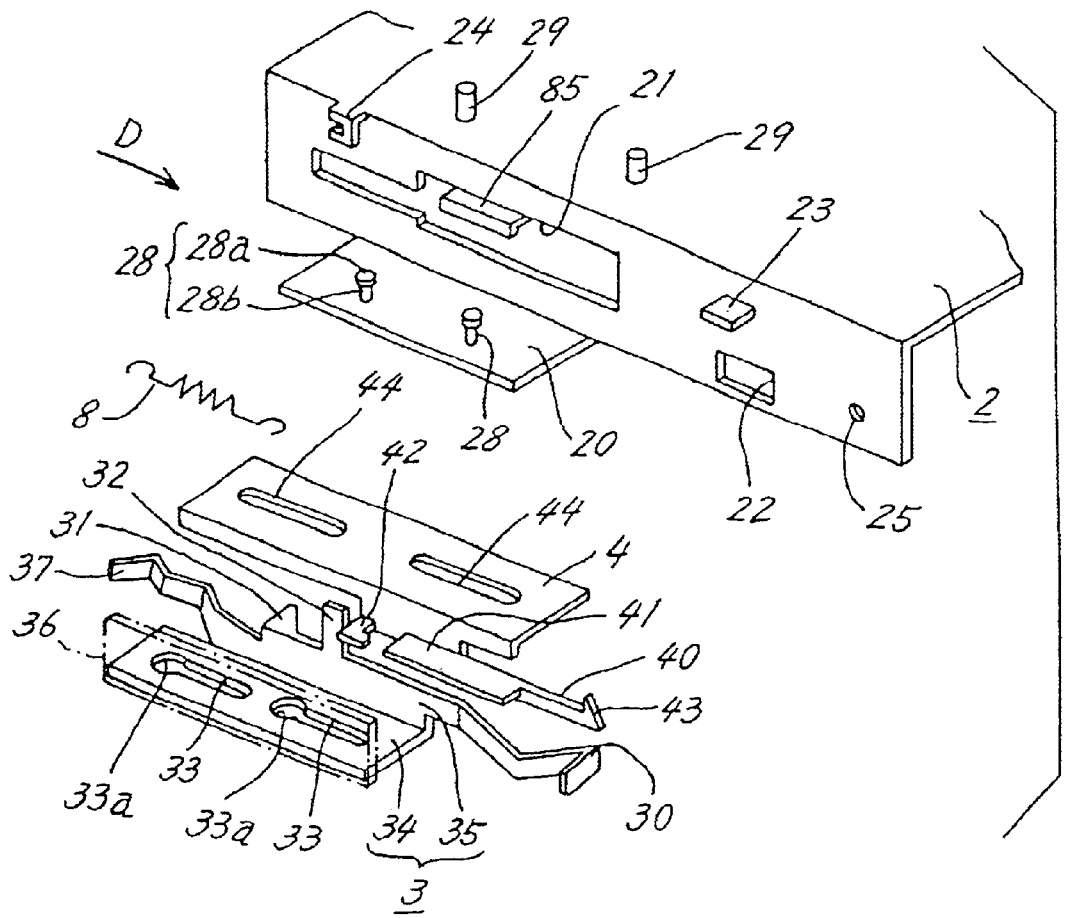
FIG. 2 is an exploded perspective view of a holder and a slide member.

FIG. 2 is an exploded perspective view of the holder 2 and the slide member 3. The slide member 3 comprises an overlaid plate 34 having a vertical plate 35 extending upward from a side portion thereof. Slits 33 are formed in the over laid plate 34. The slits 33 have fitted therein pins 28 projecting from the support plate 20, rendering the slide member 3 movable in the cartridge inserting and unloading directions. The pin 28 is a stepped pin comprising a small-diameter shank 28b and a flange 28a formed at the top end thereof. The slots 33 in the slide member 3 are each enlarged at one end to provide a large hole 33a having a slightly larger diameter than the flange 28a.

The slide member 3 is mounted on the support plate 20 by positioning each large hole 33a in register with the flange 28a and thereafter moving the slide member 3 rearward. The flanges 28a prevent the slide member 3 from slipping off.

A restraining piece 85 extends outward beyond an upper edge of an apertured portion 21 of the holder 2, and the vertical plate 35 of the slide member 3 is positioned inwardly of the restraining piece 85. The slide member 3 is prevented from backlashing outward by the restraining piece 85.

A lock slide 4 is disposed above the slide member 3. The lock slide 4 is provided with slits 44, 44 having fitted therein pins 29, 29 projecting from the upper wall of the holder 2, whereby the lock slide 4 is made movable in the cartridge inserting and unloading directions.

The slide member 3 is made from a metal plate by bending and is in the form of an integral piece comprising a tooth 31 projecting inward from the rear end of the vertical plate 35, a projection 32 extending upward from the approximate midportion of length of the vertical plate 35, a latch 30 positioned at the front end of the vertical plate 35 and having an inwardly projecting end, and a spring piece 37 extending rearward from the rear end of the vertical plate 35. The tooth 31 advances into the holder 2 to come into contact with an end face of the shutter 61, and the spring piece 37 is fittable into the hole 62 of the shutter 61. The tooth 31 and the spring piece 37 are movable in the cartridge inserting and unloading directions unlike those of the prior art.

The lock slide 4 is formed from a metal plate by bending and integrally has an engaging hook 40 extending from the lengthwise midportion thereof toward its front end, and a spring retainer 42 projecting outward from the approximate midportion of length thereof. The engaging hook 40 is elastically deformable downward and has a slope 43 at its outer end. A push plate 41 extends outward from the hook 40 in the vicinity of its base end.

The holder 2 shown in FIG. 2 has the aperture 21 for the tooth 31 to move in and a hole 22 positioned forwardly of the aperture 21. The latch 30 fits into the hole 22, with the cartridge 6 inserted into the holder 2 completely. A lug 23 with which the hook 40 is engageable projects outward from the holder 2 above the hole 22.

A hook 24 is provided on the holder 2 at the rear end thereof. The lock slide 4 is biased rearward by a tension spring 8 engaged with the hook 24 and the spring retainer 42 of the lock slide 4. The contact of the front ends of the slit portions 44 with the pins 29 restrains the lock slide 4 from moving rearward. The projection 32 of the slide member 3 bears on the rear side of the spring retainer 42, permitting the lock slide 4 to bias the slide member 3 rearward by virtue of the bearing contact. The biasing force of the tension spring 8 is greater than the shutter biasing force of the torsion spring 66 inside the cartridge 6.

The cartridge 6 is inserted into the holder 2 as pivotally moved upward. Signals are recorded or reproduced, with the cartridge 6 positioned as opposed to the chassis 1 by the downward pivotal movement of the holder 2. The head lever 7 will not be described below for convenience of description.

Figure 4A:
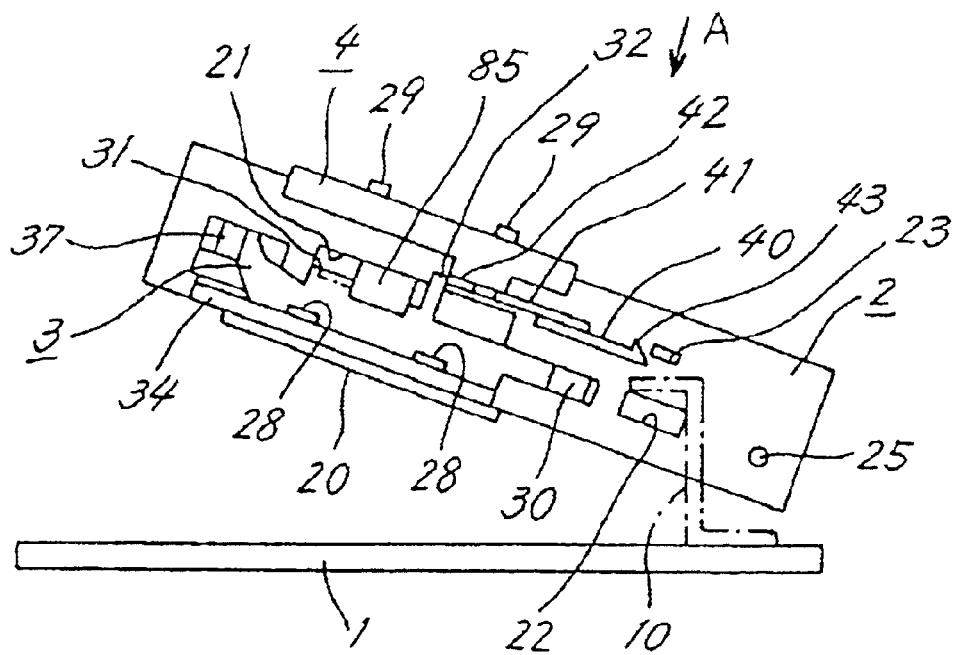
FIGS. 4A, 4B are side elevations of the holder in a raised position, FIG. 4A showing the holder before being loaded with the cartridge, FIG. 4B showing the holder with the cartridge inserted therein completely.
Figure 4B:
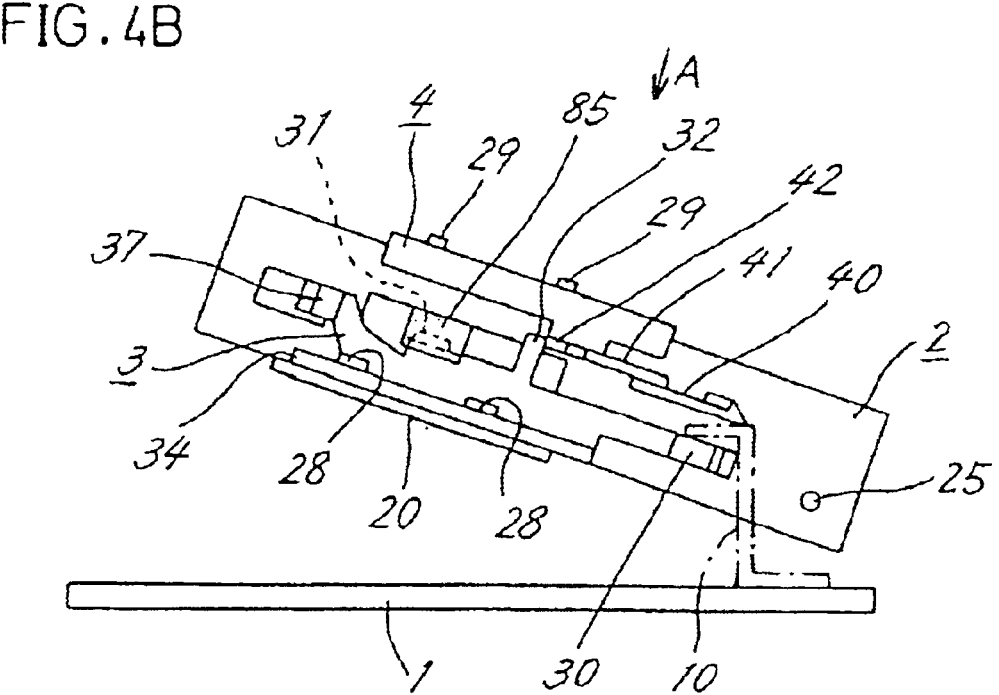

FIGS. 4A, 4B are side elevations of the holder 2 in a raised position, FIG. 4A showing the holder before being loaded with the cartridge 6, FIG. 4B showing the holder with the cartridge 6 inserted therein completely. Before the cartridge 6 is inserted, the slope 43 of the engaging hook 40 is positioned in the rear of the lug 23. The latch 30 is positioned in the rear of the hole 22 in the holder 2.

A description will be given below of the insertion of the cartridge 6.

[Inserting the Cartridge]

FIGS. 5A, 5B and FIGS. 6A, 6B are sectional views of the holder 2 of FIG. 4A as it is seen from the direction A. For convenience of illustration, the cartridge is inserted in the upward direction in the illustration. The lock slide 4 and the tension spring 8 are not shown in FIGS. 5A, 5B, 6A, 6B.

Figure 5A:
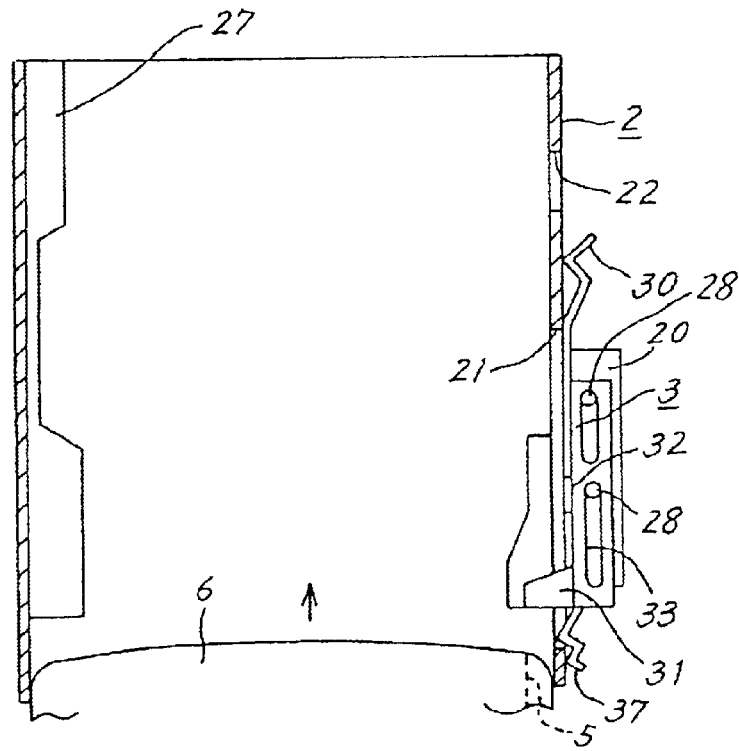
FIGS. 5A, 5B are views showing the holder of FIGS. 4A, 4B, respectively, as it is seen from the direction A.
Figure 5B:
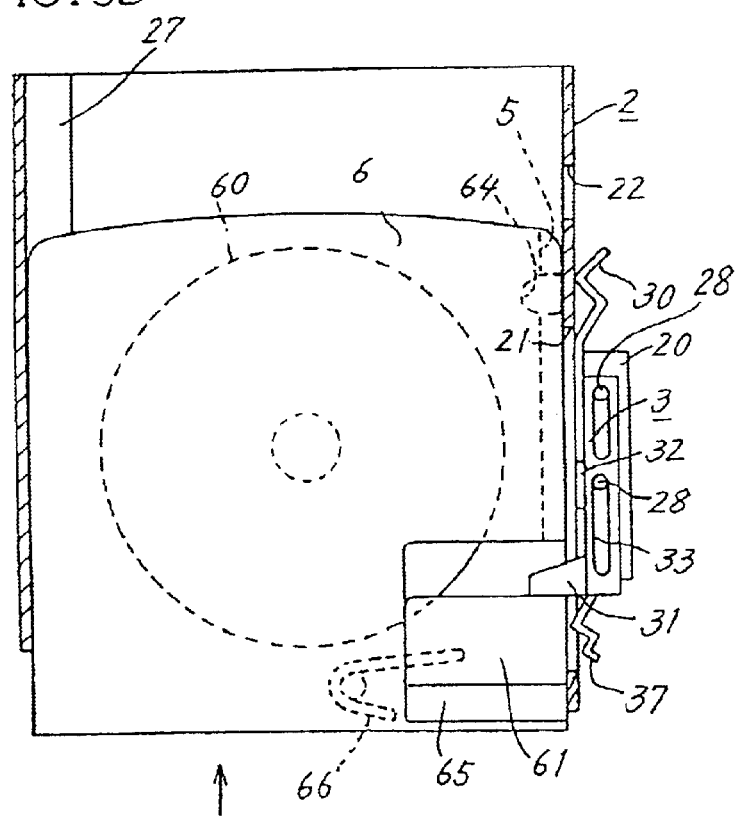

When the cartridge 6 is inserted into the holder 2 from the state shown in FIG. 5A, the tooth 31 of the slide member 3 fits into the slit 5 of the cartridge 6 and comes into contact with the shutter 61. Since the force of the tension spring 8 biasing the slide member 3 rearward is greater than the force of the torsion spring 66 of the cartridge 6, the slide member 3 remains unmoved as seen in FIG. 5B even if the cartridge 6 is pushed. The shutter 61 is opened against the torsion spring 66.

Figure 6A:
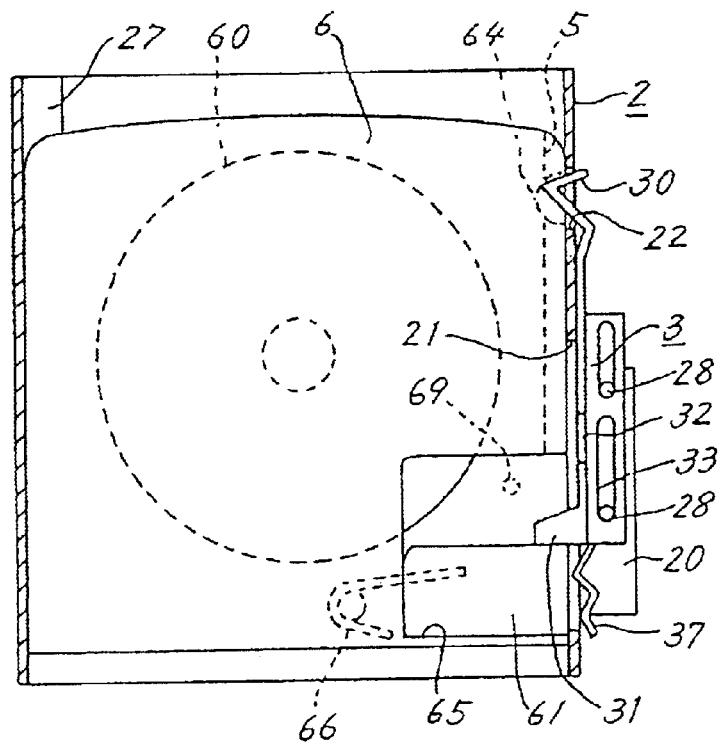
FIGS. 6A, 6B are sectional views of the same, FIG. 6A showing the holder with the cartridge inserted therein completely, FIG. 6B showing the same with a shutter opened.
Figure 6B:
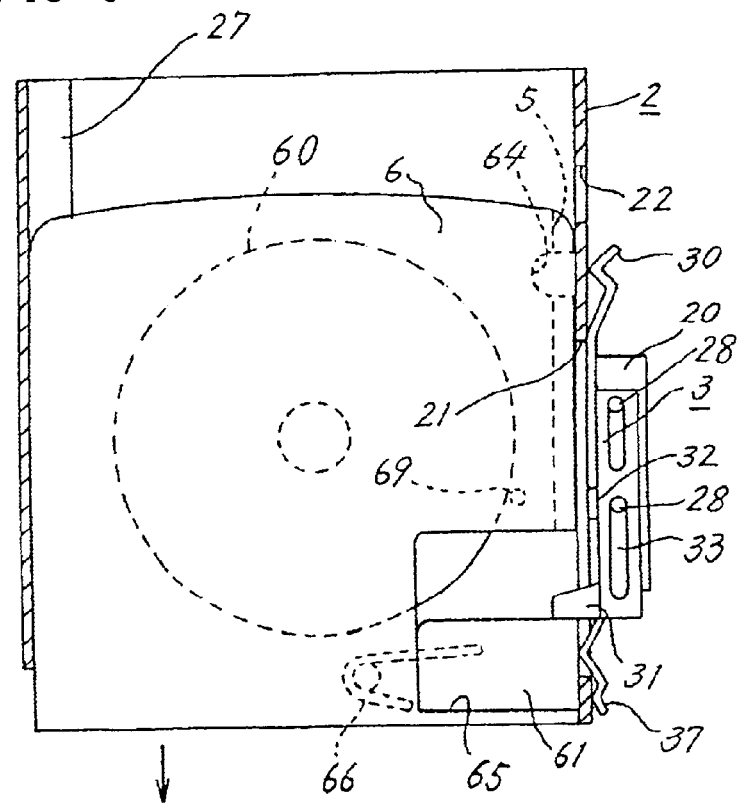

When the shutter 61 is opened completely, the shutter 61 is brought into contact with the rear edge of the recessed portion 65 as seen in FIG. 6B. The latch 30 does not reach the hole 22 since the slide member 3 remains unmoved. The projection 69 of the holder 2 is in contact with the upper surface of the cartridge (see FIG. 7B). The cartridge 6 is inserted into the holder 2 with slight friction given by contact with the projection 69, whereby the holder 2 is prevented form backlashing upward and downward.

The cartridge 6 is further pushed in. The shutter 61, which does not open further, pushes the tooth 31 of the slide member 3, advancing the slide member 3 to fit the latch 30 into the hole 22 as seen in FIG. 6A. The latch 30 inserted through the hole 22 lightly engages in the caved portion 64 of the cartridge 6, holding the cartridge 6 completely inserted in the holder.

On the other hand, the projection 32 of the slide member 3 shown in FIG. 4A is in contact with the spring retainer 42 of the lock slide 4, so that the lock slide 4 advances against the tension spring 8 when the slide member 3 is pushed. The slope 43 of the engaging hook 40 in the state shown in FIG. 4A comes into contact with the lug 23, whereby the hook 40 is deformed by deflection. Upon the slope 43 moving past the lug 23, the engaging hook 40 restores itself elastically, coming into engagement with the lug 23 as shown in FIG. 4B.

Figure 7A:
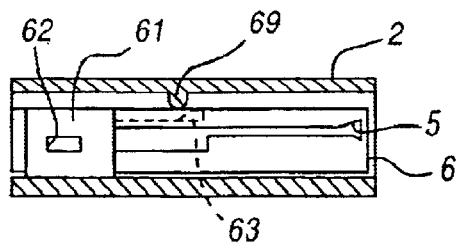
FIGS. 7A, 7B are side elevations in section, FIG. 7A showing a projection as positioned in an aperture, FIG. 7B showing the projection as positioned on the cartridge.
Figure 7B:
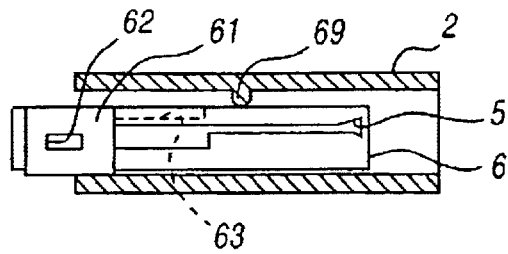

At this time, the projection 69 of the holder 2 is positioned within the aperture 63 (see FIG. 7A). Thus, the projection 69 is held out of contact with the cartridge 6 which is completely loaded in the holder 2.

If the projection 69 were in contact with the upper surface of the cartridge 6 when the cartridge 6 is completely loaded in the holder 2, there would be an increased frictional force between the cartridge 6 and the holder 2. When to be unloaded, the cartridge 6 needs to be moved against the force of static friction between the cartridge 6 and the holder 2, necessitating a greater force for unloading the cartridge 6. With the present embodiment, however, the projection 69 is positioned within the aperture 63 and is unlikely to increase the force of static friction between the cartridge 6 and the holder 2. In other words, the cartridge 6 comes into contact with the projection 69 during movement in the unloading direction and is therefore unloaded against a force of dynamic friction between the cartridge 6 and the projection 69. Since the force of dynamic friction is generally smaller than the force of static friction, the load acting on the cartridge 6 to be unloaded is diminished.

Further if the projection 69 is always in contact with the upper surface of the cartridge 6, the inside thickness of the holder 2 is the thickness of the cartridge 6 plus the height of the projection 69. With the present embodiment, however, the projection 69 is positioned within the aperture 63 on completion of loading of the cartridge 6 into the holder 2, so that the inside thickness of the holder 2 can be smaller.

With the cartridge 6 completely loaded in the holder 2, the projection 69 may be positioned between the aperture 63 and the shutter 61. This is functionally equivalent to the above case.

When the engaging hook 40 is engaged with the lug 23 as shown in FIG. 4B, the lock slide 4 is restrained from moving in the cartridge unloading direction, and the cartridge 6 is held engaged by the latch 30. With the latch 30 fitting in the hole 22 of the holder 2, the slide member 3 is unlikely to move in the direction of unloading from the holder 2 inadvertently.

When the holder 2 is lowered from this state, signals can be recorded or reproduced. When the holder 2 as lowered is raised, the engaging hook 40 is disengaged from the lug 23 by the release means 10 for unloading the cartridge 6. A detailed description of this movement will not be given.

[Preventing the Spring Piece from Entering the Slit]

The present embodiment is characterized by reducing the likelihood of the spring piece 37 entering the slit 5.

Figure 8:
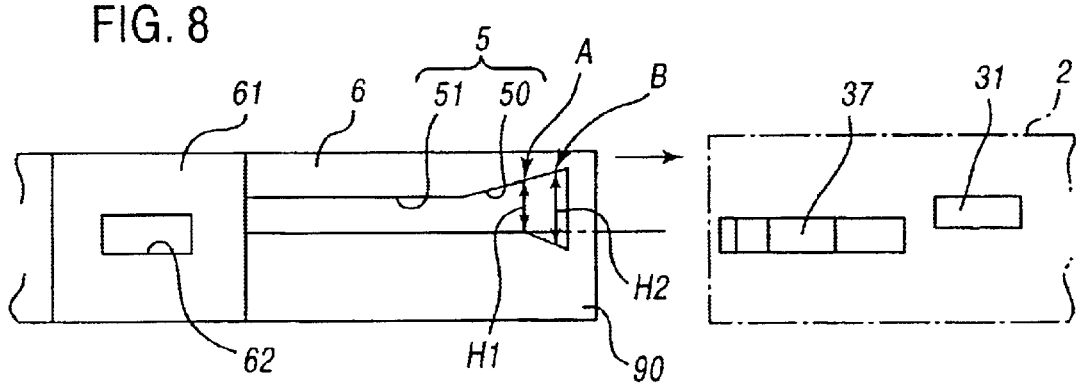
FIG. 8 is a side elevation showing the levels of a slit in the cartridge, a spring piece and a tooth.
Figure 9:
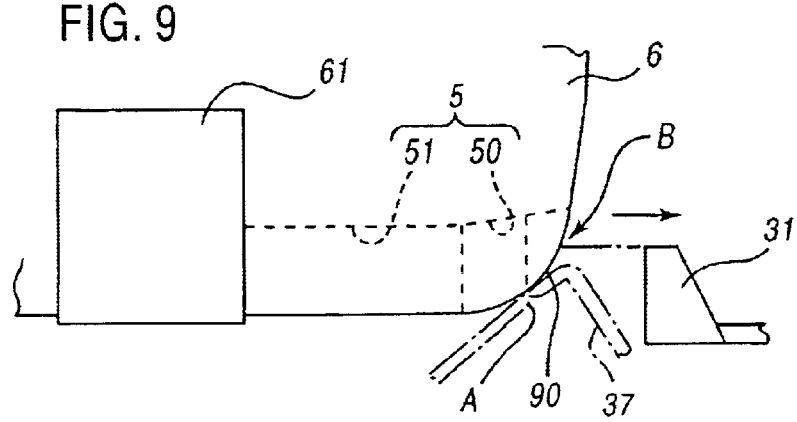
FIG. 9 is a plan view of FIG. 8.
Figure 10:
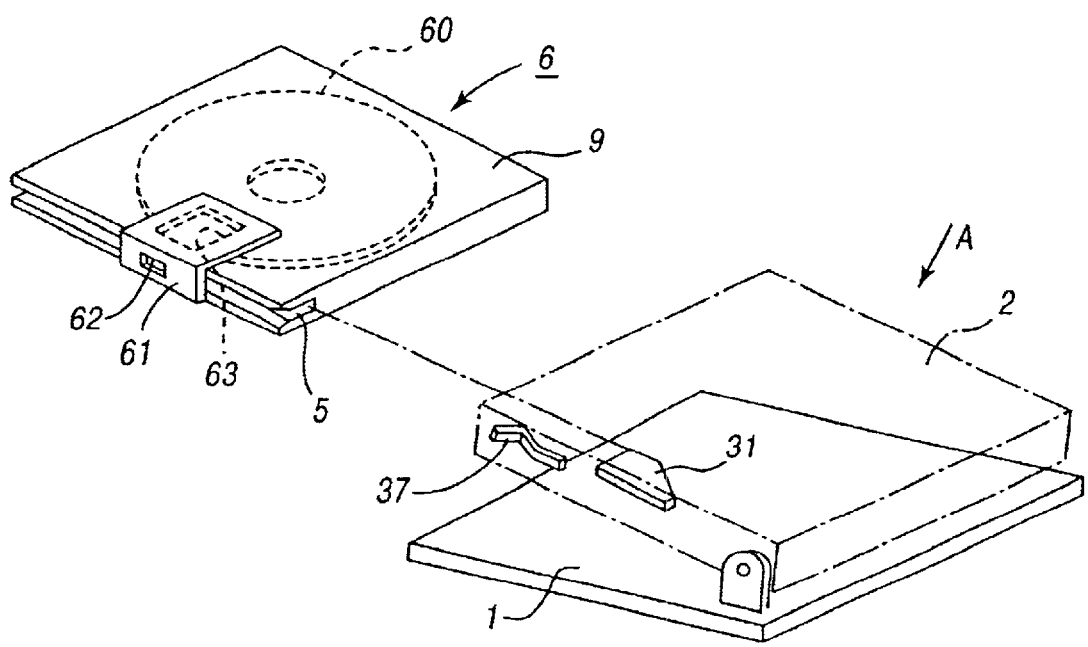
FIG. 10 is a perspective view of conventional cartridge and holder.
Figure 11:
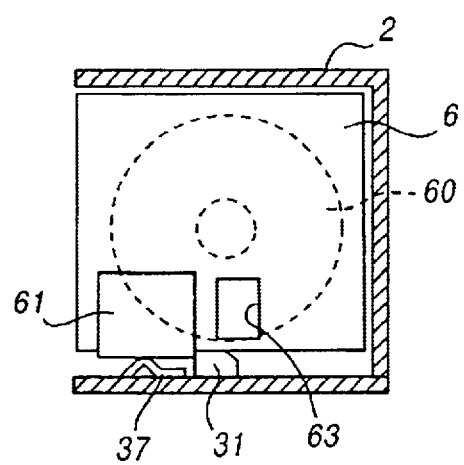
FIG. 11 is a plan view in section of the holder with the cartridge accommodated therein.

FIG. 8 is a side elevation showing the levels of the slit 5 of the cartridge 6, the spring piece 37 and the tooth 31, and FIG. 9 is a plan view of the same. For convenience of description, the tooth 31 is shown as positioned close to the spring piece 37. The fitting hole 62 in the shutter 61 shown in FIG. 8 is formed at the approximate midportion of thickness of the cartridge 6, and the spring piece 37 is positioned at a level corresponding to the fitting hole 62. The slit 5 is positioned slightly upwardly of the approximate midportion of thickness of the cartridge 6. The tooth 31 is positioned at a level corresponding to the slit 5. The slit 5 is formed at a position slightly shifted from the approximate midportion of thickness of the cartridge 6 to prevent the cartridge 6 from being inserted erroneously as turned upside down.

The slit 5 provides the guide groove 50 extending from the front end of a horizontal groove 51 and enlarging toward the front. The guide groove 50 is formed over the entire area of the contact face 90 which is in the form of a circular arc as previously stated. The groove 50 therefore extends forwardly inward. The spring piece 37 is fittable into the fitting hole 62 in the side wall of the shutter 61, while the tooth 31 is brought into contact with the end face of the shutter 61, so that the inner end of the tooth 31 is positioned inwardly of the portion of the spring piece 37 fitting in the hole 62.

As shown in FIG. 9, accordingly, the location B where the path of movement of the contact face 90 intersects the inner end of the tooth 31 is positioned inwardly of the location A where the path of movement intersects the spring piece 37. Since the contact face 90 extends forwardly inward in the form of a circular arc, the location B is positioned forwardly of the location A. Because the guide groove 50 enlarges toward the front, the width H1 of the guide groove 50 at the location A is smaller than the width H2 of the groove 50 at the location B as seen in FIG. 8. Accordingly, the width of the guide groove 50 at the location A where the spring piece 37 comes into contact with the contact face 90 is smaller than the width of the front opening of the groove 50. This diminishes the likelihood of the spring piece 37 fitting into the slit 5 in error, further permitting the tooth 31 to fit into the slit 5 with increased freedom.

Figure 12:
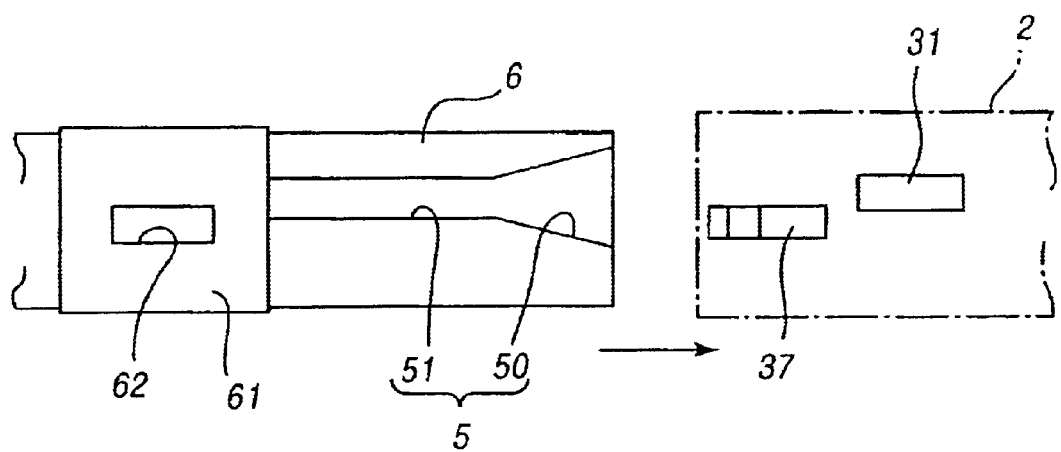
FIG. 12 is a side elevation showing the levels of a slit in the cartridge, a spring piece and a tooth of the prior art.

Indicated in a chain line in FIG. 8 is the lower edge of guide groove 50 in the conventional cartridge shown in FIG. 12. With the slit 5 of the present embodiment, the lower edge of the horizontal groove 51 is made longer than in the prior art toward the front to thereby reduce the likelihood of the spring piece 37 erroneously fitting into the slit 5. Especially the likelihood of the spring piece 37 erroneously fitting into the slit 5 can be minimized by elongating the lower edge of the horizontal groove 51 to the vicinity of the location A.

Although positioned upwardly of the midportion of width of the cartridge 6, the slit 5 may be positioned downwardly of the midportion. The tooth 31 is then positioned at a level corresponding to the position of the slit 5.

Further although made in the form of a circular arc bulging outward, the contact face 90 may be in the form of a slope (not shown) extending from the location A of FIG. 9 to the location B.

INDUSTRIAL APPLICABILITY

The cartridge 6 is inserted toward the tooth 31. Since the inner end of the tooth 31 is opposed to the location B on the contact face 90 as shown in FIGS. 8 and 9, the tooth 31 advances into the guide groove 50 at the location B.

On the other hand, the spring piece 37 comes into contact with the contact face 90 at the location A which is to the rear of the location B. The guide groove 50 is enlarged toward the front and therefore has a smaller width at a rear position than at a front position. Accordingly, the guide groove 50 has a smaller width at the location A than at the location B, consequently reducing the likelihood of the spring piece 37 fitting into the slit 5 in error owing to a backlash of the cartridge 6.

Furthermore, the cartridge 6 has the contact face 90 at its corner for reducing the likelihood of the spring piece 37 fitting into the slit 5. The conventional problem can be solved by a simple construction.

What is claimed is:

1. A cartridge having a shutter (61) movable forward and rearward for exposing or alternatively enclosing a disk (60) contained in a shell (9), the shell (9) being insertable into a device provided with a tooth (31) for opening the shutter (61) and a spring piece (37) fittable to the shutter (61) and positioned at a level different from that of the tooth (31), the tooth (31) having an inner end positioned inwardly of the spring piece (37), the shell (9) having a slit (5) formed in a side face thereof in the vicinity of the shutter (61) for permitting the tooth (31) to advance thereinto, the cartridge being characterized in that:

the shell (9) has a corner in the vicinity of the slit (5) and providing a contact face (90), the slit (5) being provided at a front end portion thereof with a guide groove (50) positioned in the contact face (90) and enlarging toward the front, the contact face (90) being in the form of a circular arc or slope and so shaped that when the shell (9) is inserted into the device, the contact face (90) comes into contact with the inner end of the tooth (31) at a location B which is positioned forwardly of a position A where the contact face (90) comes into contact with the spring piece (37), a horizontal groove (51) of the slit (5) having a lower end portion extending to the vicinity of the location A, the guide groove (50) enlarging toward the front and being provided forwardly of the vicinity of the location A.

2. A recording or reproduction device for disks having a holder permitting insertion of a cartridge comprising a shell having an aperture for exposing the disk and a shutter provided on the shell, and a tooth disposed inside the holder for opening the shutter with the insertion of the cartridge, the recording or reproduction device being characterized in that a projection adapted to come into contact with an upper surface of the cartridge is provided on the holder inside thereof, the projection being positioned in the aperture exposed by the shutter as opened or between the aperture and the shutter when the cartridge is inserted in the holder.

\* \* \* \* \*